US012053899B2

(12) United States Patent
Marx et al.

(10) Patent No.: US 12,053,899 B2
(45) Date of Patent: Aug. 6, 2024

(54) SLICING MACHINE

(71) Applicant: MULTIVAC SEPP HAGGENMUELLER SE & CO. KG, Wolfertschwenden (DE)

(72) Inventors: Dominik Marx, Giessen (DE); Timo Greeb, Dillenburg (DE); Christian Dersch, Breidenbach (DE); Albert Hartmann, Dietmannsried (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 0 days.

(21) Appl. No.: 17/854,454

(22) Filed: Jun. 30, 2022

(65) Prior Publication Data

US 2023/0001601 A1 Jan. 5, 2023

(30) Foreign Application Priority Data

Jun. 30, 2021 (DE) ......................... 102021116847.3

(51) Int. Cl.
*B26D 7/32* (2006.01)
*B26D 7/22* (2006.01)

(52) U.S. Cl.
CPC ............... *B26D 7/32* (2013.01); *B26D 7/225* (2013.01); *B26D 2210/02* (2013.01)

(58) Field of Classification Search
CPC ........ B26D 7/27; B26D 7/28–30; B26D 7/32; B26D 7/225; B26D 2210/02; B26D 2210/04–08
See application file for complete search history.

(56) References Cited

U.S. PATENT DOCUMENTS 4,598,618 A * 7/1986 Kuchler ................... B26D 7/32 83/365
4,651,601 A * 3/1987 Sasaki .................... B21D 28/12 83/13
5,724,874 A * 3/1998 Lindee ..................... B26D 7/22 83/403.1

(Continued)

FOREIGN PATENT DOCUMENTS

EP 3 175 952 A2 6/2017
EP 3 539 739 A1 9/2019

(Continued)

OTHER PUBLICATIONS

German Search Report (with English Machine Translation) Dated Jun. 3, 2022, Application No. 10 2021 116 847.3, Applicant MULTIVAC Sepp Haggenmueller SE & Co. KG, 24 Pages.

(Continued)

*Primary Examiner* — Adam J Eiseman
*Assistant Examiner* — Richard D Crosby, Jr.
(74) *Attorney, Agent, or Firm* — Brooks Kushman, P.C.

(57) ABSTRACT

In order to reliably avoid collisions between components of a slicing machine, in particular between a blade and another component, a control run is carried out before the start of a slicing operation, during which the respective component that has a risk of collision or the respective counter-component is brought into a position closest to the other component and tested to see whether a collision occurs.

11 Claims, 6 Drawing Sheets

(56) References Cited

U.S. PATENT DOCUMENTS

| | | | | |
|---|---|---|---|---|
| 5,970,840 | A * | 10/1999 | Yan | B26D 7/01 83/717 |
| 6,119,566 | A * | 9/2000 | Yan | B26D 7/01 83/717 |
| 6,568,307 | B1 * | 5/2003 | Gunther | G01N 1/06 83/915.5 |
| 6,634,268 | B1 * | 10/2003 | Guenther | G01N 1/06 83/75 |
| 7,971,510 | B2 * | 7/2011 | Weber | B26D 7/2635 83/72 |
| 9,393,622 | B2 | 7/2016 | Schroeder et al. | |
| 9,834,384 | B2 * | 12/2017 | Dopp | B26D 1/0006 |
| 9,950,869 | B1 * | 4/2018 | Pryor | A22C 11/00 |
| 10,179,419 | B2 * | 1/2019 | Kuhmichel | G01L 1/22 |
| 10,399,360 | B2 | 9/2019 | Schuetz | |
| 10,639,798 | B2 * | 5/2020 | Pryor | B25J 11/0045 |
| 2002/0017174 | A1 * | 2/2002 | Gammerler | B26D 7/2635 83/72 |
| 2002/0197122 | A1 * | 12/2002 | Mizutani | G05B 19/4015 82/1.11 |
| 2004/0231476 | A1 * | 11/2004 | Weber | B26D 7/2635 83/13 |
| 2007/0028742 | A1 * | 2/2007 | Mueller | B26D 5/02 83/676 |
| 2011/0126680 | A1 * | 6/2011 | Weber | B26D 7/2635 83/13 |
| 2012/0060659 | A1 * | 3/2012 | Weber | B26D 7/2635 83/72 |
| 2013/0068076 | A1 * | 3/2013 | Schmeiser | B26D 7/2635 83/13 |
| 2013/0167701 | A1 * | 7/2013 | Koch | B26D 1/143 83/435.11 |
| 2015/0040521 | A1 | 2/2015 | Huebner et al. | |

FOREIGN PATENT DOCUMENTS

| | | | |
|---|---|---|---|
| WO | 2017/013040 | A1 | 1/2017 |
| WO | 2021/110361 | A1 | 6/2021 |

OTHER PUBLICATIONS

D1—EN 2006/42/EG—Richtlinie 2006/42/EG Des Europaischen Parlaments Und Des Rates, Dated May 17, 2006, 63 Pages.

D1—EN 2006/42/EC—Directive 2006/42/EC of the European Parliament and of the Council (English Machine Translation), Dated May 17, 2006, 63 Pages.

D6—EN 1974:2020—6 Nachweis der Sicherheitsanforderungen und/oder—massnahmen, Tabelle 2 (with English Machine Translation—Evidence of the safety requirements and/or measures, Table 2), 2 Pages.

* cited by examiner

SLICING MACHINE

CROSS-REFERENCE TO RELATED APPLICATIONS

This application claims foreign priority benefits under 35 U.S.C. § 119(a)-(d) to German patent application number DE 10 2021 116 847.3, filed Jun. 30, 2021, which is incorporated by reference in its entirety.

TECHNICAL FIELD

The disclosure relates to slicing machines, in particular so-called slicers, with which strands of an only slightly compressible product such as sausage or cheese are cut into slices in the food industry.

BACKGROUND

Because these strands can be produced with a cross section that maintains its shape and dimensions well over its length, i.e., essentially constant, they are often called product calibers.

In most cases, several product calibers arranged parallel to each other are cut at the same time by the same blade, which moves in transverse direction to the longitudinal direction of the product calibers, cutting off one slice at a time in a single pass.

The product calibers are pushed forward by a feed conveyor of a feed unit in the direction of the rotating blade of the cutting unit, usually on an obliquely downwardly directed feed conveyor, and are each guided through the product openings of a plate-shaped cutting frame, at the front end of which the part of the product caliber projecting beyond it is cut off as a slice by the blade immediately in front of the cutting frame.

As a rule, the slices fall onto a discharge conveyor of a discharge unit, which often consists of several parts in the conveying direction, by means of which they are transported away for further processing.

Since the separated slices are frequently not to be processed further, e.g., packaged, individually but assembled, usually overlapping, as portions, the first conveyor of the discharge conveyor unit in the discharge direction is usually embodied as a so-called portioning belt. This means that it can be moved forward and usually also backward quickly and in a defined stepwise manner by the desired distance of the slices within the portion.

In addition, this first discharge conveyor, usually a conveyor belt, can be adjusted in height, usually also in position in the discharge direction, and can be pivoted and, if necessary, also adjusted in its transverse direction.

The blade, which can be driven in rotation, can also be adjusted in a variety of ways.

On the one hand, the rotation axis is adjustable in at least one of its transverse directions, and on the other hand, the blade is generally adjustable along the rotation axis, on the one hand in order to be able to set the distance to the front surface of the cutting frame in cutting operation, and on the other hand in order to be able to lift the blade with its rotation axis from this front surface for an empty cut.

While a circular segment-shaped blade or a sickle blade rotates around a stationary rotation axis during slicing operation, the rotation axis of a circular disk-shaped blade must be moved in the direction of the cutting frame, i.e., the product caliber, and back again for each cut, whereby the two extreme positions of this movement of the rotation axis can usually also be adjusted.

Due to the multiple adjustment possibilities of the blade on the one hand and the adjustable and/or otherwise movable components of the slicing machine located close to the blade on the other hand, collisions between the blade and one of these other components may occur during slicing operation, since the adjustments of the blade on the one hand and the other adjustable components on the other hand are usually carried out independently of each other.

In particular, during the slicing operation, automatic adjustment of both the blade and the other adjustable components often takes place, depending on the progress of the slicing operation, effected by the control system on the basis of the slicing program stored in the control system for this batch of product caliber.

SUMMARY

It is therefore an object according to the disclosure to provide a method for operating a slicing machine, in particular a slicer, which prevents such collisions during slicing operation, as well as a slicing machine, in particular a slicer, suitable for this purpose.

With regard to the method for operating a slicing machine, in particular a slicer, without collision of the cutting unit, in particular the blade, during slicing operation with another component of the machine, this object is solved by carrying out a control run with regard to the occurrence of a collision before the start of slicing operation.

In this process, the cutting unit, in particular the blade, and/or the one or more components located in the vicinity of the blade during slicing operation, in particular if they are adjustable during slicing operation, especially the portioning belt, are moved relative to each other in the direction of maximum mutual approach and checked to see whether a collision of the blade or another part of the cutting unit with one of the other components then occurs.

To avoid damage during the control run, the blade does not rotate around its rotation axis, or at most with a maximum of 10 rpm, then it preferably rotates backwards, i.e., against the direction of rotation during slicing operation.

In order to avoid damages also during the control travel and to be able to easily detect an occurring collision, instead of one of the potential colliding components and/or the cutting unit, in particular the blade, in addition to this component of the slicing machine, which is functional for the slicing operation, a control element can be inserted at its potential colliding location, in particular a disembodied control element such as a light beam, which does not cause any damages upon contact with the other potential colliding element.

For example, the light beam, which preferably runs in the width direction of the slicing machine and thus horizontally, can be arranged as a tangent to the flying circle of the blade at its lowest point of the flying circle, which is closest to the discharge conveyor unit, while the cutting edge, due to the corresponding rotational position of the blade, is just not located at this lowest point or altogether in the lowest area of the flying circle.

Then it is checked for collision not of the blade itself, but of this control element with one of the other potentially colliding components of the slicing machine during the control run.

The control element can be stationary, for example at the maximum low position of the lowest point of the flying circle of the blade or on the cutting unit and together with it movably arranged at the lowest point of the flying circle.

If the control element is the light beam of a photoelectric sensor, the photoelectric sensor can simultaneously serve as a collision sensor and report the interruption of the light beam to the control.

In the following description, the execution of the control run with the control element instead of the functional component of the slicing machine for the slicing operation is not mentioned separately each time, but is to be included as an alternative in each case.

If a collision is detected during the control run, the control can react differently:

- only one warning signal can be issued by the control for the operator, or instead or in addition can
- either the start of the slicing operation completely refused by the control system
- or those absolute positions of the cutting unit, in particular of the blade on the one hand and/or of the other potentially colliding components on the other hand, for which a collision was detected during the control run, or the corresponding relative positions to each other have been stored by the control and the control does not allow these positions to be approached during the slicing operation, in particular even if they are provided for in the corresponding slicing program.

In this way, collisions occurring during slicing operation can be reliably avoided, and also the resulting expense in the form of damage, parts replacement and thus downtime of the slicing machine.

The extent to which the potentially colliding components are moved against each other can be handled differently:

- either as far as is possible from the embodiment of the machine
- or as far as the maximum approach in the slicing program of the slicing machine control for the upcoming batch of product calibers to be sliced, in which case the intended maximum approach of each of the components against each of the other components potentially at risk of collision should be checked individually.

Whether a collision occurs can of course be done visually by the operator without technical aids, but is preferably done automatically:

For this purpose, at least one corresponding sensor is provided, for example a camera that scans the possible collision area, but preferably rather a sensor for a parameter that allows a collision to be detected, for example a current sensor that checks the current consumption of the respective electric variable speed drive or rotary drive for the blade or the other potentially colliding components, or a sensor that directly or indirectly detects the torque and/or the following error of the variable speed drive or rotary drive for the blade.

If resistance is encountered when the blade or component is moved, this is manifested by an increase in such parameters, in particular current consumption, above a predefined threshold value compared to normal operation, which is interpreted by the control as the presence of a collision.

Preferably, such an automatic collision check in the form of a control run is stored in the control as a standard condition for starting the slicing operation, so that the control run cannot be forgotten.

Preferably, during the control run, the cutting unit, in particular the blade, and the component potentially colliding with it—with the control run preferably being carried out separately for each one of such potentially colliding components—are not both moved towards the approach at the same time, but usually only one of them at a time.

The first possibility consists in bringing the adjustable components of the slicing machine, for example the portioning belt and/or the entire discharge conveyor unit, which are located in the vicinity of the blade and which are adjustable, in particular also during slicing operation, and thus potentially colliding, into a position closest to the cutting unit, in particular the blade, and then moving the blade to the maximum position approaching this component to be tested.

In the process, the blade—at least in the case of a circular disc-shaped blade also along the rotation axis about which it normally rotates—is moved as far as possible in the direction of this component, whether in the direction of the rotation axis or transverse to it.

In the case of a non-circular disk-shaped blade, such as a circular segment-shaped blade or a sickle blade, the blade is additionally rotated in this approximated position, preferably by one complete revolution, preferably against the direction of rotation during slicing operation, in order to check whether or not the blade area projecting furthest radially beyond the rotation axis then reaches the potentially colliding component.

Of course, the blade during the control run is not rotated or rotated much slower than in slicing mode, preferably by no more than 10 rpm, better by no more than 5 rpm, in order to keep the sequence of the collision as low as possible in case of a collision occurring during the control run.

Preferably, therefore, when the rotation axis and the potentially colliding component approach each other, the non-circular-disk-shaped blade is first held in such a rotational position that the recess provided in the circumferential direction away from the cutting edge faces the component to be tested, and then the blade is rotated, in the case of a sickle blade against the usual direction of rotation, whereas in the case of a circular-segment-shaped blade the direction of rotation is irrelevant.

In doing so, the blade can be moved as far as possible in the direction of this component by

- moving along its blade axis, i.e., in direction Z3 towards this component and/or
- moving transversely to its rotation axis, downward, in particular perpendicular to the direction Z3 in the downward direction X3 and/or
- moving transversely to its rotation axis to the side, in particular in the width direction of the discharge conveyor unit, in particular perpendicular to the direction Z3 in the horizontal direction Y3.

A second possibility is to first adjust the blade, in particular also along the blade axis, as far as possible in the direction of the component to be tested for collision and—in the case of a non-circular disk-shaped blade—to direct the blade area projecting furthest radially from the rotation axis against this component by means of a corresponding rotational position of the blade.

After that, the component potentially colliding with the blade, such as the portioning belt, is moved from a position far from the blade, and in particular from its position farthest from the blade, towards its position closest to the blade, using all movement and adjustment possibilities of this component, i.e., several positions closest to the blade may also have to be checked, if it is not clear which of these is the absolute closest position.

Moving to the position closest to the blade can be done in different ways:

On the one hand, by pivoting:

In the case of the rearmost, blade-nearest, most upstream conveyor, the portioning belt of a discharge conveyor unit as a component to be checked for collision can be the portioning belt is moved by pivoting about its first pivot axis, which is located in particular in the downstream half of its swing arm (in the direction of its blade-nearest position) and/or the portioning belt is moved in the direction of its position nearest to the blade by pivoting about a second pivot axis of a portioning swing arm part which receives the portioning belt, in particular the second pivot axis downstream of the portioning belt and/or the portioning belt is moved in the direction of its position nearest to the blades by pivoting about a third pivot axis of a discharge conveyor swing arm receiving the portioning belt, which pivot axis is located in particular downstream of the portioning belt.

On the other hand by linear moving:

In the case the rearmost, blade-nearest, most upstream conveyor, the portioning belt of a discharge unit as a component has to be checked for collision the portioning belt and/or its portioning swing arm and/or the swing arm receiving it and/or the overall swing arm in which all conveyors of the discharge conveyor are received, is moved upward, in particular in direction X17, toward its blade-nearest position by moving, in particular linearly be moved upwards in vertical direction X17, in particular and/or be moved to the side, especially in horizontal direction Y17.

The test described so far primarily for the portioning belt should also be carried out for other components arranged close to the blade in slicing operation, in particular the cutting frame, or in the case of a slicer with automatic interleaver feed for the air nozzle then usually present for applying the interleaver to the underside of the sliced slice, or for a cardboard feed unit which places a packaging element such as a cardboard or also a tray trough on the portioning belt, the corresponding feed unit.

Furthermore, such a collision check can be performed not only between the blade and another component of the slicing machine, but also between the blade and consumables, such as a tray to be fed during operation and/or a cardboard, which are generally not intended to come into contact with the blade during slicing operation.

If a component to be tested for collision is a conveyor belt, in particular an endless conveyor belt that circulates during operation, this is preferably also driven in circulation during the collision test, especially if it is not a conveyor belt with a smooth support surface, in order to see whether, during the circulation of the protrusions of the conveyor belt, the beginnings and ends of link chains or even the slight displacement of the conveyor belt during circulation do not also cause a collision.

Preferably, however, the conveyor belt is then driven in the opposite direction to its normal conveying direction so that, in the event of a collision with the blade, the blade does not enter the conveyor belt with its cutting edge during the collision test.

Regardless of which is the moving component during a control run, the collision check with regard to the blade should be carried out both in its non cutting position and in its cutting position.

With regard to a slicing machine, such as a slicer, which, in addition to a cutting unit with a blade that can be driven in rotation about a blade axis, comprises a large number of components whose positions can be adjusted, in particular also automatically during slicing operation, some of which components could collide with the blade during slicing operation, the control system controlling the slicing machine should be designed in such a way that it is capable of carrying out the method as described above and thus, in particular, of performing an automatic or at least partially automatic collision check as part of a control run.

Preferably, one or more collision sensors are provided for this purpose, which are of course connected to the control of the slicing machine by means of data technology and can report to the control any collision that occurs during the control run.

This can be a camera directed at the possible collision area or a current flow sensor on the adjustment drive of the adjustable component and/or the adjustment drive of the blade, but also on the rotation drive of the blade during its slow drive as part of the control run.

BRIEF DESCRIPTION OF THE DRAWINGS

Embodiments according to the disclosure are described in more detail below by way of examples, with reference to the following figures showing.

DETAILED DESCRIPTION

Figure 1A:
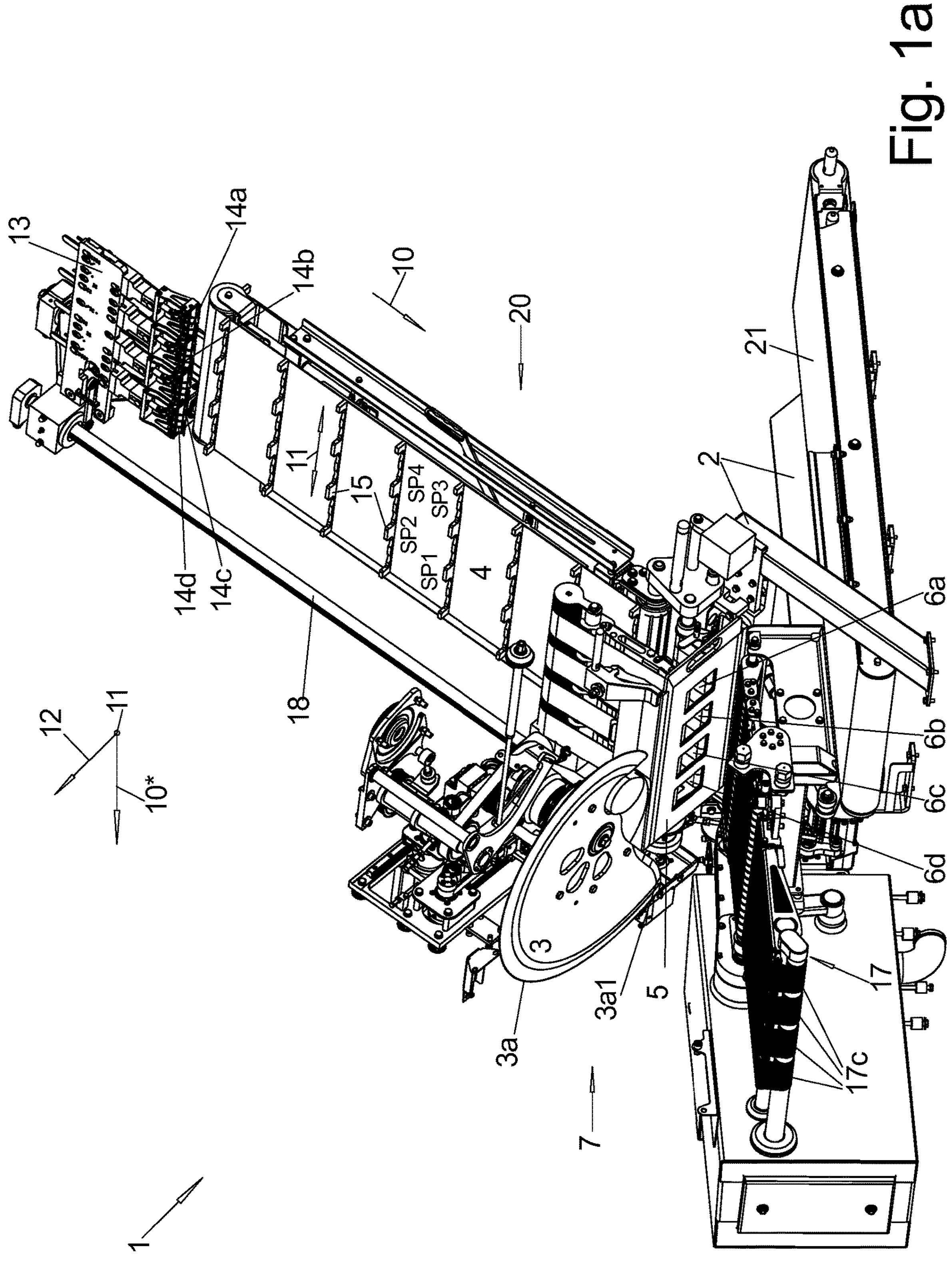
FIG. 1*a, b*: a slicing machine in the form of a slicer according to the prior art in different perspective views, with the feed belt pivoted up into the slicing position.
Figure 1B:
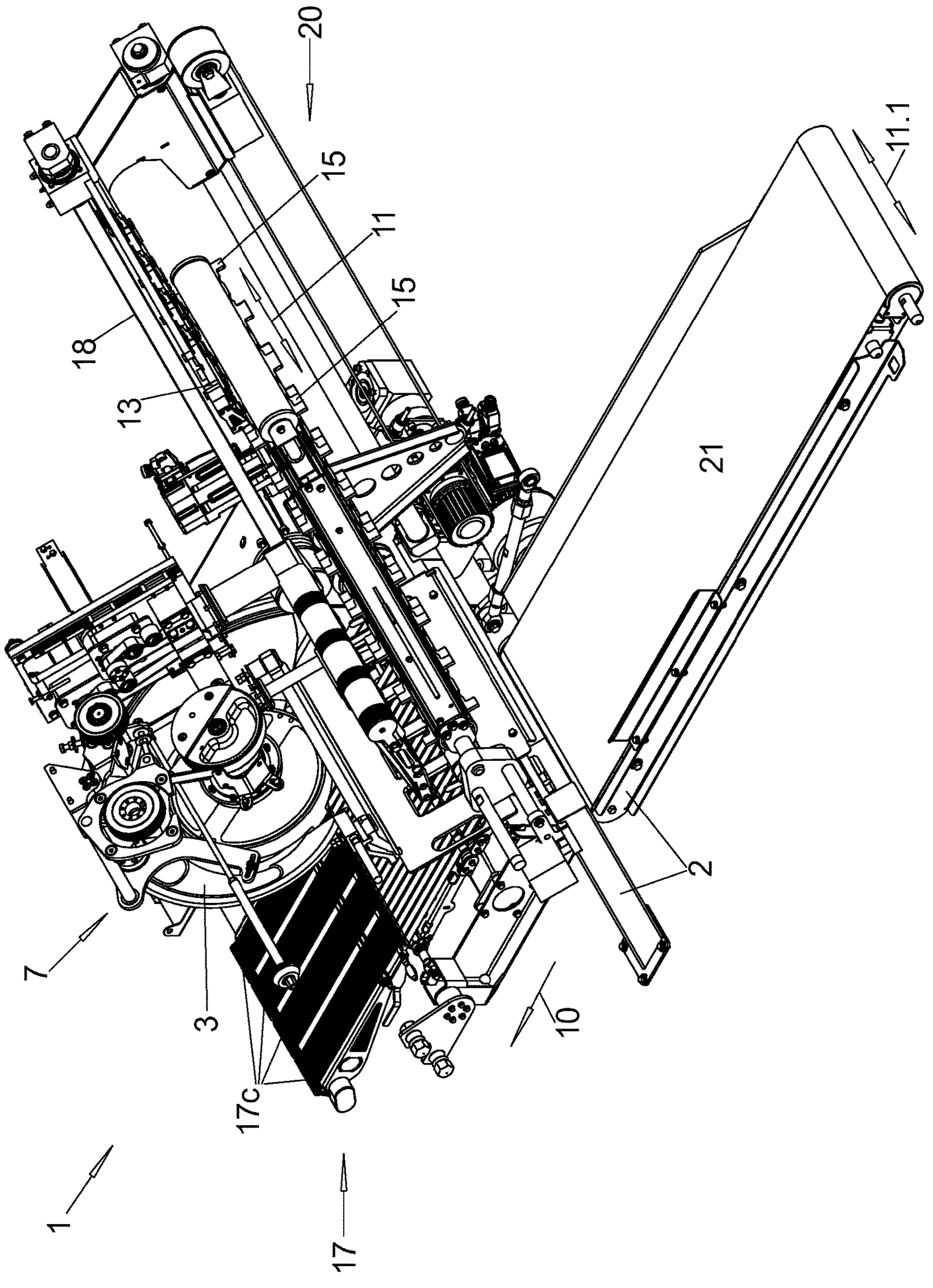
FIG. 1*c*: the slicing machine of FIG. 1*a, b* in side view with the panels removed so that the various conveyor belts can be seen more clearly.

FIGS. 1*a*, 1*b* show different perspective views of a multi-track slicer 1 for simultaneous slicing of several product calibers K on one track SP1 to SP4 each side by side and depositing in shingled portions P each consisting of several slices S with a general passage direction 10*through the slicer 1 from right to left.

Figure 1C:
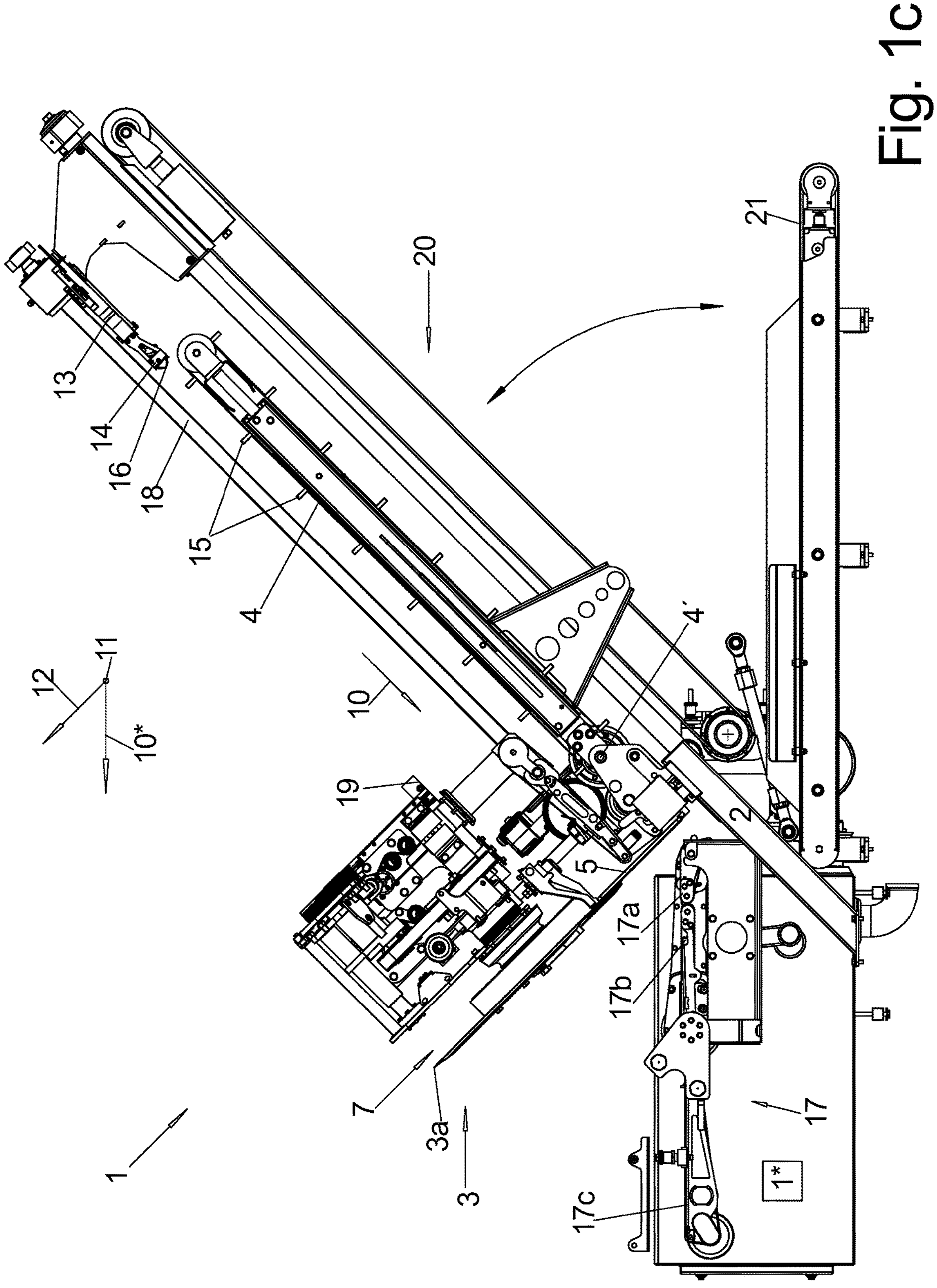
Figure 2A:
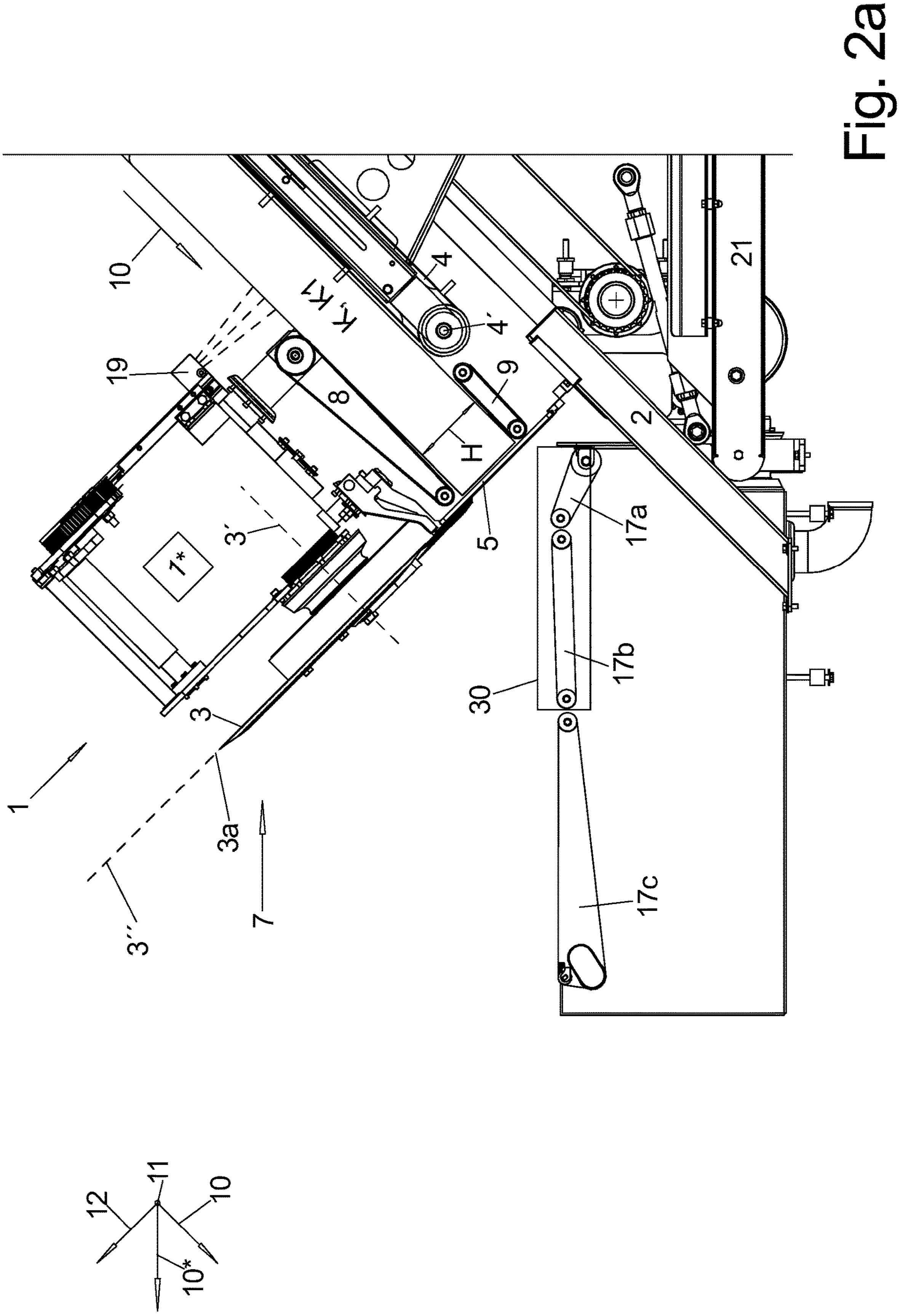
FIG. 2*a*: an enlarged and simplified side view of the slicing machine loaded with a product caliber compared to FIG. 1*c;*

FIG. 1*c* and FIG. 2*a* show—without and with inserted caliber K—a side view of this slicer 1, omitting covers and other parts not relevant to the disclosure, which are attached to the base frame 2 like all other units, so that the functional parts, especially the conveyor belts, can be seen more clearly. The longitudinal direction 10 is the feeding direction of the calibers K to the cutting unit 7 and thus also the longitudinal direction of the calibers K lying in the slicer 1.

It can be seen that the basic structure of a slicer 1 according to the state of the art is that a cutting unit 7 with blades 3 rotating about a rotation axis 3', such as a sickle blade 3, is fed with several, in this case four, product calibers K lying transversely to the feeding direction 10 next to one another on a feed conveyor 4 with spacers 15 of the feed conveyor 4 between them are fed by this feed unit 20, from the front ends of which the rotating blade 3 cuts off a slice S with its cutting edge 3*a* in each case in one operation, i.e., almost simultaneously.

Figure 2B:
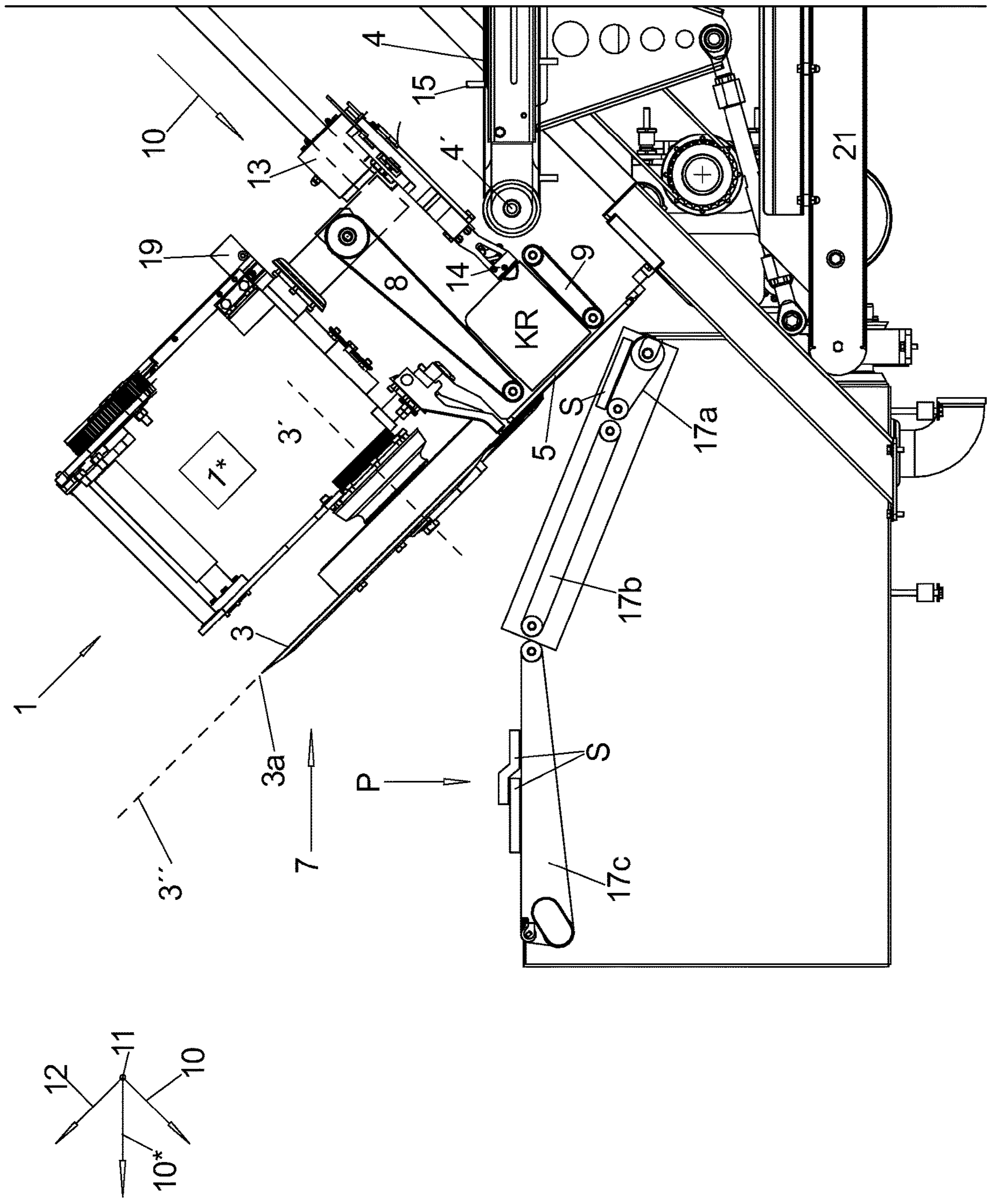
FIG. 2*b*: a side view as in FIG. 2*a*, but with the feed belt pivoted down into the loading position and the product caliber cut open except for a caliber remnant.

For cutting the product calibers K, the feed conveyor 4 is in the cutting position shown in FIGS. 1*a*-2*a*, which is oblique in side view with a low-lying cutting-side front end and a high-lying rear end, from which it can be pivoted down about a pivot axis 4' running in its width direction, the first transverse direction 11, which is located in the vicinity of the cutting unit 7, into an approximately horizontal loading position as shown in FIG. 2*b*.

The rear end of each caliber K lying in the feed unit 20 is held positively by a gripper 14*a-d* with the aid of gripper claws 16 as shown in FIG. 2*a*. These grippers 14*a*-14*d*, which can be activated and deactivated with respect to the position of the gripper claws 16, are attached to a common gripper slide 13, which can be moved along a gripper guide 18 in the feeding direction 10.

Both the feed of the gripper slide 13 and of the infeed conveyor 4 can be driven in a controlled manner, but the actual feed speed of the calibers K is effected by a so-called upper and lower product guide 8, 9, which are also driven in a controlled manner and which engage on the upper side and lower side of the calibers K to be cut open in their front end regions near the cutting unit 7.

The front ends of the calibers K are each guided through product opening 6*a-d* of a plate-shaped cutting frame 5, with the cutting plane 3" running directly in front of the front end face of the cutting frame 5, which points obliquely downwards, in which the blade 3 rotates with its cutting edge 3*a* and thus cuts off the protrusion of the calibers K from the cutting frame 5 as a slice S. The cutting plane 3" lies perpendicular to the upper run of the feed conveyor 4 and/or is spanned by the two transverse directions 11, 12 to the feeding direction 10.

The inner circumference of the product openings 6*a-d* serves as a counterblade for the cutting edge 3*a* of the blade 3.

Since both product guides 8, 9 can be driven in a controlled manner, in particular independently of each other and/or possibly separately for each track SP1 to SP4, these determine the—continuous or clocked—feed speed of the calibers K through the cutting frame 5.

The upper product guide 8 can be displaced in the second transverse direction 12—which is perpendicular to the surface of the upper run of the feed conveyor 4—in order to adapt to the height H of the caliber K in this direction, which is usually determined by means of a height sensor 19. Furthermore, at least one of the product guides 8, 9 can be embodied to be pivotable about one of its deflecting rollers in order to be able to change the direction of the strand of its guide belt resting against the caliber K to a limited extent.

The slices S standing at an angle in space during separation fall onto a discharge unit 17 starting below the cutting frame 5 and running in passage direction 10*, which in this case consists of a plurality of discharge conveyors 17*a, b, c* arranged with their upper runs approximately aligned one behind the other in passage direction 10*, of which the first discharge conveyor 17*a* in the passage direction 10 can be embodied as a portioning belt 17*a*, in that it can be driven in a clocked manner in at least one, preferably in both, directions of rotation and/or one can also be embodied as a weighing unit.

The slices S can hit on the discharge conveyor 17 individually and spaced apart in the passage direction 10* or, by appropriate control of the portioning belt 17*a* of the discharge unit 17—the movement of which, like almost all moving parts, is controlled by the control 1*—form shingled or stacked portions P, by stepwise forward movement of the portioning belt 17*a* between the hitting operations. As one skilled in the art would understand, the control 1* may include suitable hardware and/or software, such as one or more suitable processors, in communication with, or configured to communicate with, one or more storage devices or media including computer readable program instructions that are executable by the one or more processors for controlling operation of the slicing machine 1, or components thereof, and/or for performing functions recited herein.

Below the feed unit 20 there is usually an approximately horizontal end piece conveyor 21, which starts with its front end below the cutting frame 5 and directly below or behind the discharge conveyor 17 and with its upper run thereon—by means of the drive of one of the discharge conveyors 17 against the passage direction 10—transports falling residues to the rear.

Figure 3:
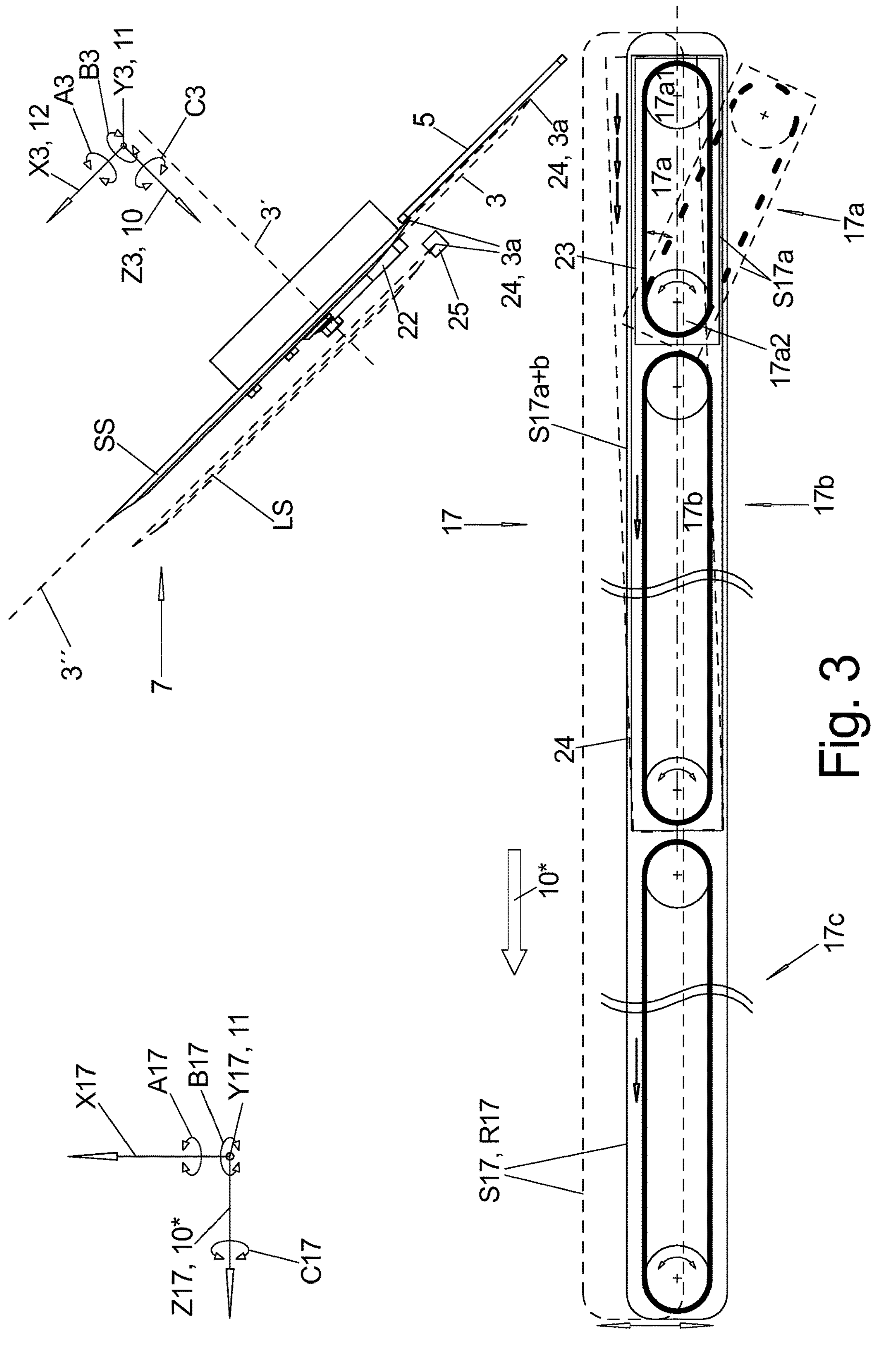
FIG. 3: a side view of the cutting and discharge area, enlarged again compared to FIGS. 2*a*, 2*b*, showing the specific adjustment possibilities of both the blade and the discharge conveyor unit.

FIG. 3 shows on the one hand the movement possibilities of the blade 3 of the cutting unit 7 and on the other hand the movement possibilities, in particular adjustment possibilities, of the discharge unit 17 consisting in this case of three discharge conveyors 17*a*—the portioning belt—17*b* and 17*c*, which however do not necessarily all have to be realized in total on an actual machine.

The various transverse axes and pivot axes are specified for the respective component.

The blade 3 can be moved along its rotation axis 3', the moving direction Z3, between a cutting position SS—in which it is very close to the front surface of the cutting frame 5—and a non cutting position LS, whereby both positions can of course also be finely adjusted in this direction, which is also the feeding direction 10 for the calibers K fed in.

In most machines, the blade 3 can additionally be adjusted in the two transverse directions to the rotation axis 3', the two transverse directions spanning the cutting plane 3", namely in the direction Y3, the first transverse direction 11 or width direction 11 of the entire machine, as well as in the direction X3, the second transverse direction 12 of the feed unit of the machine.

The blade can be driven in rotation around the rotation axis rotation axis 3', which thus represents the pivot axis or rotation axis C3. However, the blades can often also be pivoted about the two other transverse directions, designated as the pivot axis A3 and B3, in order to be able to set the blade plane 3" exactly parallel to the front surface of the cutting frame 3.

Since the rotation axis 3' and thus the traverse axis Z3 of the blade 3 is at an angle to the passage direction 10', the conveying direction of the discharge conveyor unit 17, the latter has its own, different coordinate system.

The upper runs of the discharge conveyors 17*a, b, c*, which are approximately at the same height, transport a slice or portion lying on them in the height-direction or transport direction 10*, the moving direction Z17 of the discharge unit 17, when they are set to a mutually aligned pivot position.

These or their components can also be moved perpendicularly to this, in particular up and down in the vertical direction X17, and if necessary also in the width direction 11, the moving direction Y17.

Most importantly, the individual conveyors and/or parts of the entire discharge unit 17 can be pivoted about the pivoting direction B17, which corresponds to the moving direction Y17, and thus their inclination can be adjusted when viewed from the side.

This applies in particular to the most upstream conveyor belt 17*a*, the portioning belt. This is usually solved in that the at least two deflecting rollers, here 17*a*1, 17*a*2 of the portioning belt 17*a*—are arranged in a swing arm S17*a* which can be pivoted about a pivot axis, here the rotation axis of the downstream deflection roller 17*a*2—between an approximately horizontal position aligned with the downstream conveyors 17*b, c* or a pivoted position, preferably with the rear end tilted downward, in which the impact of a separated slice can be reproduced more precisely, especially in portions.

In the present design, the portioning swing arm 17*a*, i.e., also its swing arm S17*a* as well as the following conveyor belt 17*b*, is accommodated together in a swing arm S17*a+b*, which can also be pivoted about a pivot axis located near its downstream end and extending in the transverse direction Y17, preferably about the pivot axis located on the rotation axis of the downstream deflection roller.

In addition to this, the swing arm S17*a* can in turn be pivoted relative to the swing arm S17*a+b*.

All three discharge conveyors 17*a, b, c* are mounted in a common frame and can thus be moved up and down in the moving direction X17 in accordance with the cutting task at hand.

This frame can additionally be embodied as a swing arm S17, which can be pivoted about a pivoting axis running in the transverse direction, in particular near its downstream end, which runs in the direction B17.

In addition, there are machine designs in which the entire discharge unit 17—but less frequently the individual conveyors 17*a, b* or *c*—have a pivoting axis A17 about the upright direction X17 and/or a pivoting axis C17 about the conveying direction Z17 of the discharge conveyor.

As can be seen from the solidly drawn blade 3, the blade 3 is a non-circular disk-shaped blade, for example a circular segment blade or preferably a sickle blade, which in FIG. 3 is in such a rotational position about the rotation axis 3' that its cutting edge 3*a* momentarily projects further from the axis of rotation 3' obliquely upwards than obliquely downwards, where the cutting edge 3*a* lies in the region of the upper end of the slice 5, as is the case before the start of a cutting process of a new slice.

For cutting off, the blade 3 rotates a maximum of one complete revolution until the cutting edge 3*a*—as additionally shown with this blade 3 drawn through—is in the lowest position reachable by the cutting edge 3*a* along the front surface of the cutting frame 5.

In addition, FIG. 3 shows the counterweight 22, which is part of the blade holder 23 to which the blade 3 is screwed, and which protrudes over the front surface of the blade 3 facing in the direction of the discharge conveyor unit 17.

Since when the blade 3 is moved in the direction Z3, e.g., between the cutting position SS and the non cutting position LS, the entire cutting unit 7 and thus also the counterweight 22 are moved, in extreme cases this can also be a component at risk of collision.

The collision check before starting the slicing operation can be performed in different variants, which can also be used in combination with each other, e.g.:

Variant A=Blade 3 is Rotated:

The blade 3 is brought into such a rotational position around the rotation axis 3' that its cutting edge 3*a* projects as little as possible downward below the rotation axis 3'. At the same time, the blade 3 is moved downward at an angle in the direction Z3 as far as possible, at least to the non cutting position LS.

With regard to the discharge unit 17, the individual swing arms are in their at least horizontal position, preferably in their maximum upwardly pivoted position, and the overall frame R17, in which all discharge conveyors 17*a, b, c* of the discharge unit 17 are accommodated, is in the maximum raised position.

Now the blade 3 is slowly rotated about its rotation axis 3', i.e., the pivot axis C3, preferably in the opposite direction to the direction of rotation during cutting, and it is checked whether the rear end 3*a*1 of the cutting edge 3*a*, visible for example in FIG. 1*a*, collides with one of the other components, in particular the discharge conveyor unit 17.

Variant B=Total Frame R17 is Moved Upwards:

The blade 3 is brought into a rotational position about the rotation axis 3' in which the rear end 3*a*1 of its cutting edge lies below, preferably exactly below, the cutting axis 3'.

Otherwise, the blade as well as the individual discharge conveyors 17*a, b, c* as well as their oscillators are adjusted as described for variant A.

Now, for the collision check, the overall frame R17 is moved upwards in direction X17 and checked whether a collision occurs with one of the parts of the blade unit, in particular the cutting edge of the blade and/or the counterweight 22 and/or also the cutting frame 5.

Variant C=Portioning Unit 17 or One of its Discharge Conveyors is Pivoted Upwards:

The blade is adjusted as described in variant B.

The individual swing arms of the discharge conveyor unit, be it S17*a* and/or S17*a+b* and/or S17 are moved to their pivot position projecting furthest downwards.

To check for collisions, all the swing arms present are pivoted upward—one after the other and/or simultaneously—to the maximum upward pivoted position and checked to see whether a collision then occurs with a component of the blade unit.

Variant D=Blade 3 is Moved in Axial Direction Z3:

The blade is brought as close as possible in the axial direction to the front surface of the cutting frame 5 or the cutting plane defined by this.

Otherwise, the blade is adjusted as described in variant B.

The portioning unit 17 is in the uppermost position with the overall frame R17 in the direction of X17 and all the discharge conveyor swing arms are in the maximum upward pivoted position.

To check for collisions, the blade is now moved in its axial direction Z3, i.e., along its rotation axis 3', obliquely downwards against the portioning unit 17 at least to the non cutting position LS or to the maximum attainable position of the blade 3 in this direction and checked to see whether a collision with components of the discharge conveyor 17 occurs.

Depending on which other adjustment options are available, in particular pivoting around the axes B17 and A17 or even C17 on the discharge conveyor unit 17 and/or pivoting around the axes A3 and B3 on the blade 3, control runs for collision checking can also be carried out by varying these pivot positions.

REFERENCE LIST

1 slicing machine, slicer
1* control
2 base frame
3 blade
3' rotation axis
3" blade plane, cutting plane
3*a* cutting edge
3*a*1 rear end
4 feed conveyor, feed belt
4' pivot axis

5 cutting frame
6*a-d* product opening
7 cutting unit
8 upper product guide, upper guide belt
9 bottom product guide, bottom guide belt
10 transport direction, feeding direction
10* passage direction
11 1. transverse direction (width slicer)
12 2. transverse direction (height-direction caliber)
13 gripper unit, gripper slide
14.14*a-d* gripper
15 spacer
16 gripper claw
17 discharge conveyor unit
17*a, b, c* portioning belt, discharge conveyor
18 gripper guide
19 height sensor
20 feed unit
21 end piece conveyor
22 balance weight
23 blade holder
24 control element, light
25 light barrier
X3, Y3, Z3 moving directions of blade 3
A3, B3, C3 pivoting directions of the blade 3
X17, Y17, Z17 moving directions of the discharge conveyor 17 or its components
A17, B17, C17 pivoting directions of the discharge conveyor unit 17 or its components
K product, product caliber
KR end piece
LS non cutting position
SS cutting position
S slice
P portion
R17 total frame
S17*a* portioning swing arm
S17*a+b* swing arm part
S17*a+b+c* total swing arm
S17 total swing arm

What is claimed is:

1. A method for operating a slicing machine which is used to produce shingled or stacked portions from one or more slices to be separated from a product caliber and which comprises a cutting unit with a blade which can be driven in rotation about a rotation axis and whose position can be adjusted, at least one adjustable component which can be adjusted in position, in such a way that the at least one adjustable component could potentially enter a path of movement of the rotating blade in a colliding manner, wherein the at least one adjustable component comprises an adjustable discharge unit with at least one adjustable portioning belt, the method comprising:

moving or adjusting during a control run before a start of a slicing operation, the cutting unit blade, rotating at most at 10 rpm about its rotation axis, or a control element and the at least one adjustable component; and checking whether a collision occurs between the blade or the control element and the at least one adjustable component, and the method further comprising:

measuring a current consumption and/or a torque and/or a tracking error of a variable speed drive and checking for an impermissibly high value of the measurement, detecting a collision when the measurement hast the impermissibly high value and emitting at least one warning signal by a control in response to the detected collision.

2. The method according to claim 1, wherein the collision check is carried out with maximum possible mutual approach of the at least one component and the blade and/or is carried out during a slicing program of the control of the slicing machine for a batch of product calibers at maximum possible mutual approach of the at least one component and the blade.

3. The method according to claim 1, wherein:

in response to the detected collision, st the start of the slicing operation is prohibited.

4. The method according to claim 1, wherein collision checking comprises:

bringing the at least one adjustable component of the slicing machine into its position nearest to the blade, and then moving the blade or the control element in a direction of the at least one adjustable component and carrying out a collision check while doing so, when the blade comprises a circular disc-shaped blade, moving the blade or the control element including the rotation axis in a direction of the at least one adjustable component, when the blade comprises a non-circular-disk-shaped blade, moving the blade or the control element in a direction of the at least one adjustable component and rotating the blade or the control element in a direction of the at least one adjustable component with a rear end of a cutting edge ahead in a slicing direction of rotation.

5. The method according to claim 4, wherein the blade or the control element is moved in a direction of the at least one adjustable component by moving along the rotation axis in a direction towards at least one adjustable component and/or moving transversely to the rotation axis perpendicular to a transverse direction in a downward direction and/or moving transversely to the rotation axis to a side in a width direction of the discharge unit, wherein the width direction is a horizontal direction.

6. The method according to claim 1, wherein collision checking comprises:

adjusting a cutting edge of the blade or the control element, including the rotation axis, in a direction of the at least one adjustable component to be checked for collision, when the blade comprises a non-circular disc-shaped blade, adjusting the blade with a rear end of the cutting edge in a cutting direction of rotation or the control element arranged at this position in a direction of the at least one adjustable component to be tested for collision, thereafter moving the at least one adjustable component of the slicing machine from a position remote from the blade in a direction of its position closest to the blade, and carrying out a collision check while doing so.

7. The method according to claim 1, further comprising:

moving the adjustable portioning belt by pivoting about a first pivot axis located in a downstream half, of a swing arm in a direction of a position closest to the blade and/or moving the adjustable portioning belt in a direction of a position nearest to the blade by pivoting about a second pivot axis of a portioning swing arm receiving the portioning belt, located downstream of the portioning belt and/or moving the adjustable portioning belt in a direction of a position nearest to the blade by pivoting about a third pivot axis of a total swing arm receiving the portioning belt, downstream of the portioning belt.

8. The method according to claim 1, further comprising:

moving the adjustable portioning belt upwardly in a direction of a blade-nearest position by linear movement of a portioning swing arm and/or of a swing arm receiving a positioning swing arm and/or of a total swing arm, upwards in a vertical direction and/or to the side, in a horizontal direction.

9. The method according to claim 1, wherein the at least one adjustable component further comprises a cutting frame and/or an air nozzle of an interleaver unit or another component.

10. The method according to claim 1, wherein the at least one adjustable component further comprises a conveyor belt, the method further comprising:

driving the conveyor belt in a circulating manner, in a direction opposite to a conveying direction of the conveyor belt utilized during a slicing operation.

11. The method according to claim 1, wherein the collision check is performed both in a cutting position and in a non-cutting position of the blade.

* * * * *